(12) United States Patent
Lee et al.

(10) Patent No.: US 7,672,333 B2
(45) Date of Patent: Mar. 2, 2010

(54) NON-AGILE CHANNELIZATION METHOD FOR MULTICHANNEL MAC

(75) Inventors: Sung-Won Lee, Seoul (KR); Rakesh Taori, Suwon-si (KR); Jun-Seo Lee, Seoul (KR); Young-Gon Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 925 days.

(21) Appl. No.: 11/452,209

(22) Filed: Jun. 14, 2006

(65) Prior Publication Data

US 2006/0281479 A1 Dec. 14, 2006

Related U.S. Application Data

(60) Provisional application No. 60/690,152, filed on Jun. 14, 2005.

(30) Foreign Application Priority Data

Jun. 12, 2006 (KR) .................. 10-2006-0052517

(51) Int. Cl.
*H04J 3/16* (2006.01)
*H04B 7/212* (2006.01)
*H04B 7/00* (2006.01)

(52) U.S. Cl. .................. 370/468; 370/348; 370/360; 455/509; 725/70

(58) Field of Classification Search ......... 370/464–481, 370/322–360; 375/130, 295; 455/509–516; 348/564, 731, E5.101, E5.105, E5.108; 725/41–139; 342/199, 202
See application file for complete search history.

(56) References Cited

U.S. PATENT DOCUMENTS

| 4,071,844 A * | 1/1978 | Hopwood et al. ........... 342/199 |
| 2002/0109884 A1 * | 8/2002 | Presley et al. ............... 359/172 |
| 2009/0119714 A1 * | 5/2009 | Schlarb et al. ................ 725/56 |

OTHER PUBLICATIONS

On the Achievable Rate of Three-Node Cognitive Hybrid Wireless Networks; Kyounghwan Lee et al.; 2005 International Conference on Wireless Networks, Communications and Mobile Computing; pp. 1313-1318.
Architecture and Algorithms for an IEEE 802.11-Based Multi-Channel Wireless Mesh Network; Ashish Raniwala et al.; Computer Science Department, Stony Brook University; pp. 2223-2234.
A Multi-channel infrastructure based on DCF access mechanism for Wireless LAN Mesh Networks compliant with IEEE 802.11; L. Loyola et al.; NTT Access Network Service Systems Laboratories, NTT Corporation; pp. 497-501.

* cited by examiner

*Primary Examiner*—Afsar M. Qureshi
(74) *Attorney, Agent, or Firm*—NSIP Law

(57) ABSTRACT

A non-agile channelization method for multichannel medium access control (MAC) is provided, in which an available channel is categorized as an agile or non-agile channel, an operation mode of the channel categorized as the non-agile channel is selected, and multichannel switching is performed according to the selected operation mode. The non-agile channelization method for multichannel MAC enables non-agile channel switching to create a connected network, and allows agile and non-agile channel switching to coexist to avoid a change in existing hardware.

11 Claims, 5 Drawing Sheets

NON-AGILE CHANNELIZATION METHOD FOR MULTICHANNEL MAC

CROSS-REFERENCE TO RELATED PATENT APPLICATIONS

This application claims the benefit under 35 U.S.C. § 119 (e) of a U.S. Provisional Patent Application filed in the United States Patent and Trademark Office on Jun. 14, 2005 and assigned Ser. No. 60/690,152, the entire disclosure of which is hereby incorporated by reference.

BACKGROUND OF THE INVENTION

1. Field of the Invention

The present invention relates generally to a channelization method for multichannel Medium Access Control (MAC). More particularly, the present invention relates to a non-agile channelization method for multichannel MAC.

2. Description of the Related Art

The latest Common Channel Framework (CCF) introduced in the Institute of Electrical and Electronics Engineers (IEEE) 802.11s standard is designed to support an agile or dynamic multichannel operation. However, a non-agile multichannel operation is also very useful when channel switching is performed for a fixed time. In many cases, however, the non-agile switching has difficulty in defining a boundary of the channel switching, although it is expected that the non-agile switching will provide a heterogeneous hardware capability in unmanaged networks. In addition, even though a cluster based multichannel operation is beneficial, channel switching of a mesh point (MP) group is not supported in the agile channel switching. Accordingly, there is a demand for supporting non-agile channelization in the CCF.

That is, in the multichannel MAC, there is a need to enable non-agile channel switching, and determine how to make the network connected. In addition, there is a need to determine how to make agile and non-agile channel switching coexist, and how to avoid a change in hardware.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a non-agile channelization method for multichannel MAC, for enabling non-agile channel switching to create a connected network.

It is another object of exemplary embodiments of the present invention to provide a non-agile channelization method for multichannel MAC, for making agile and non-agile channel switching coexist, to avoid a change in the existing hardware.

According to an aspect of exemplary embodiments of the present invention, there is provided a non-agile channelization method for multichannel medium access control (MAC), in which an available channel is categorized as an agile or non-agile channel; an operation mode of the channel categorized as the non-agile channel is selected; and multichannel switching is performed according to the selected operation mode.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
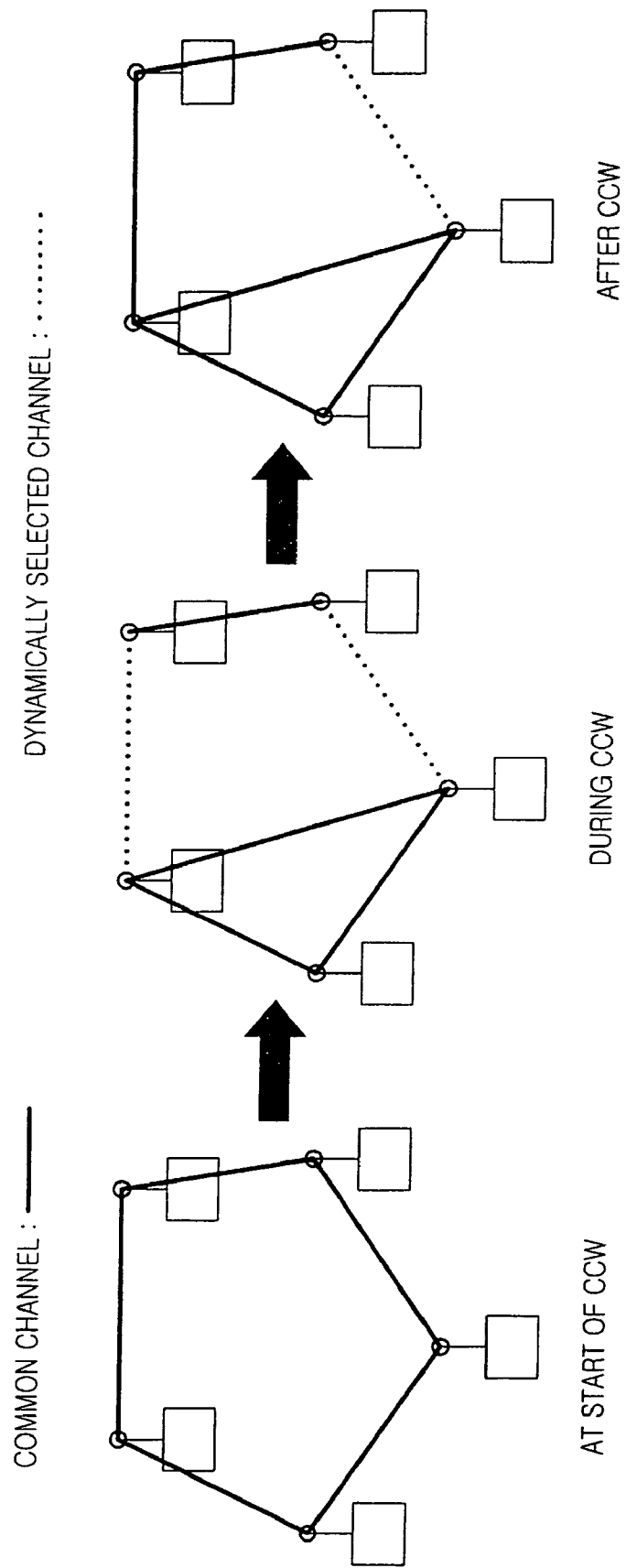
FIG. 1 is a diagram illustrating an agile channel switching scenario according to an exemplary embodiment of the present invention.

FIG. 1 is a diagram illustrating an agile channel switching scenario according to an exemplary embodiment of the present invention.

Referring to FIG. 1, 5 nodes represent MPs or mesh access points (MAPs), a solid-line link represents a common channel, and a dotted-line link represents a dynamically selected channel. The nodes operate according to a concept of Channel Coordination Window (CCW) introduced in Common Channel Framework (CCF) designed to support the agile or dynamic multichannel operation. The CCW is repeated at a period P, and CCW duration generally corresponds to a part of the period P.

At the start of CCW, all MPs are tuned in the common channel, enabling particular MPs to establish communication with each other. In addition, the channel occupied state is reset, and the MPs select available channels. Once a channel is selected by one MP, the channels selected by other MPs are marked as 'unavailable'.

During or after CCW, MPs can select different data channels, and simultaneously transmit data over the selected channels. That is, the selected channels can support multiple data transmission in an on-demand fashion. Better performance is expected as the number of available data channels increases. Also, point-to-point communication is supported.

After CCW, CCF handles channelization between Basic Service Set (BSS) and Wireless Distribution System (WDS) traffics in the MAP that can switch to a BSS channel. In this manner, the MAP can handle both the BSS and WDS traffics.

Available channels are categorized as follows in a configuration step. That is, the available channels are categorized into agile switching channels and non-agile switching channels, all of which are managed by a channel utilization vector U. To facilitate the channel selection, MPs use an N-channel utilization vector U, and the channel utilization vector U is defined as $$U=[u_1, u_2, \ldots, u_N] \quad (1)$$

where $u_i \in \{0,1\}$, for $i=1, 2, \ldots N$, $u_i=0$ indicates that a channel $u_i$ is available, and $u_i=1$ indicates that a channel $u_i$ is in use.

There are two modes of switching operation in non-agile channelization. One is a BSS-Heavy mode and another is a WDS-Heavy mode. The selection of the operation modes is up to an individual MP, and the selection is unmanaged and distributed.

Figure 2:
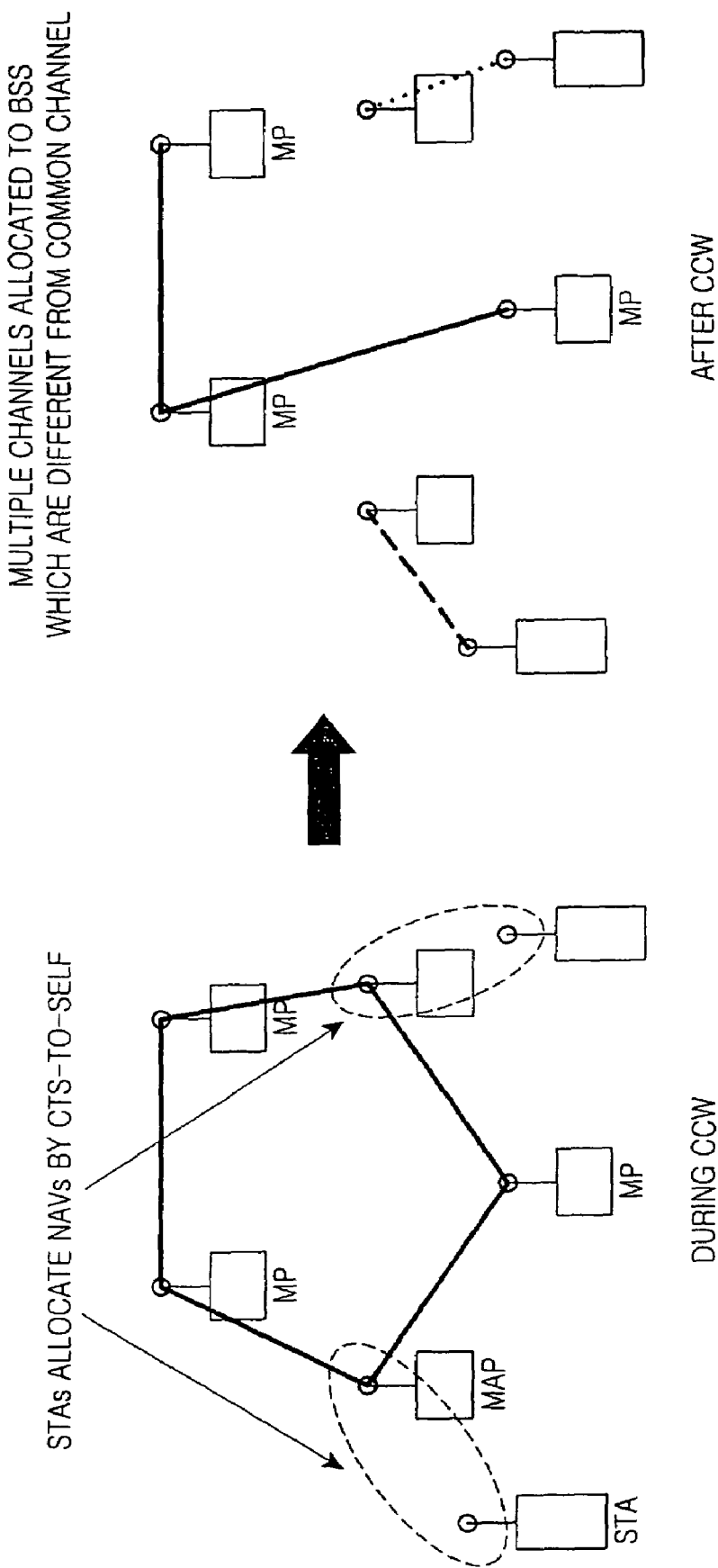
FIG. 2 is a diagram illustrating a Basis Service Set (BSS)-Heavy scenario of a BSS-Heavy mode among non-agile channelization operation modes according to an exemplary embodiment of the present invention.

FIG. 2 is a diagram illustrating a BSS-Heavy scenario of a BSS-Heavy mode among non-agile channelization operation modes according to an exemplary embodiment of the present invention.

Referring to FIG. 2, a wireless mesh network includes more than one MAP. During CCW, all MPs are given a chance to communicate with each other. That is, stations (STAs) may not be connected to their MAPs temporarily by allocating Network Allocation Vectors (NAVs) by CTS (Clear-To-Send)-TO-SELF.

After CCW, the selected MAPs handle BSS traffics in parallel. That is, multiple channels are allocated to BSS which are different from the common channel. In this manner, multiple BSS traffics can be accommodated simultaneously, increasing aggregate network throughput.

In the BSS-Heavy mode, a MAP should tune to the common channel at the start of CCW. The MAP sends CTS-TO-SELF to its STAs. The MP should tune to its BSS channel after CCW.

Figure 3:
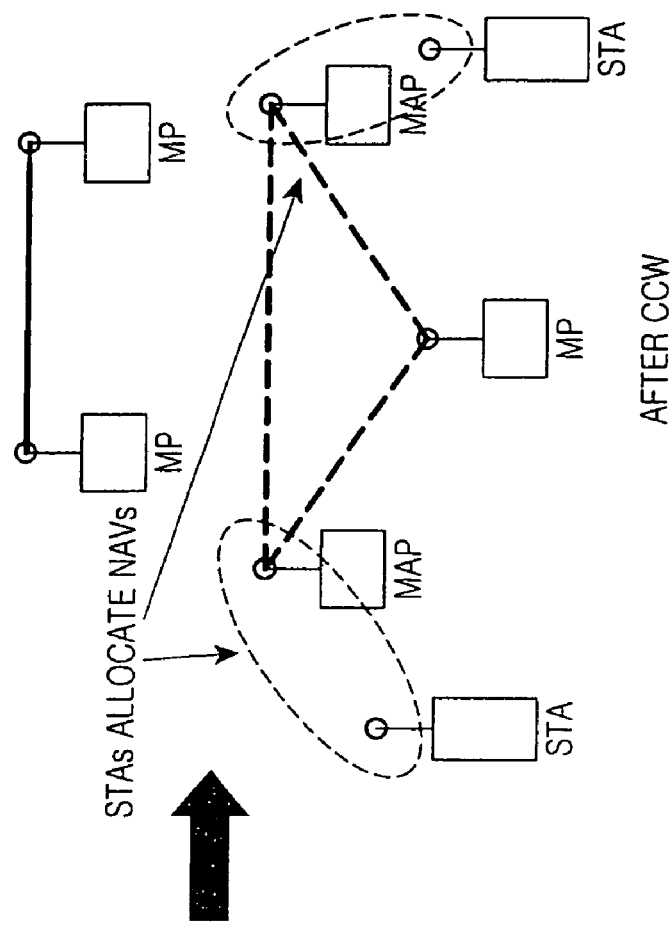
FIG. 3 is a diagram illustrating a Wireless Distribution System (WDS)-Heavy scenario of a WDS-Heavy mode among non-agile channelization operation modes according to an exemplary embodiment of the present invention.
Figure 3:
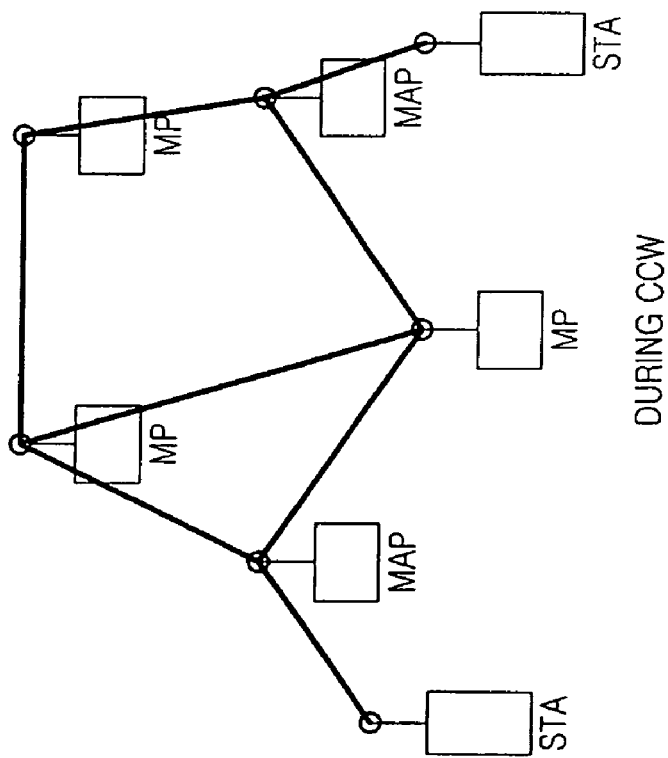

FIG. 3 is a diagram illustrating a WDS-Heavy scenario of a WDS-Heavy mode among non-agile channelization operation modes according to an exemplary embodiment of the present invention.

Referring to FIG. 3, MPs are dynamically clustering during CCW by exchanging management frames. As a result, the clustering leads to a temporary ad-hoc cluster after CCW. As the number of contentious MPs decreases, increased throughput is expected. MPs that remain on the common channel form another ad-hoc cluster.

After CCW, STAs associated to the MAPs that join ad-hoc clusters allocate NAVs by CTS-TO-SELF. As a result, multiple ad-hoc clusters operating in parallel increase the aggregate throughput.

In the WDS-Heavy mode, an MP should tune to the common channel at the start of CCW. The MP sends 'Request for Ad-hoc Clustering' through a management frame. That is, a channel index is provided, and there is no real-time constraint such as Short Inter Frame Space (SIFS) in response time.

In addition, an MP who wants to join the ad-hoc cluster replies with 'Clear for Ad-hoc Clustering' through a management frame. That is, multiple MPs can reply to the same Request for Ad-hoc Clustering (RAC) frame. In an exemplary implementation, MPs who agree to form ad-hoc clusters should switch the channel after CCW.

Figure 4:
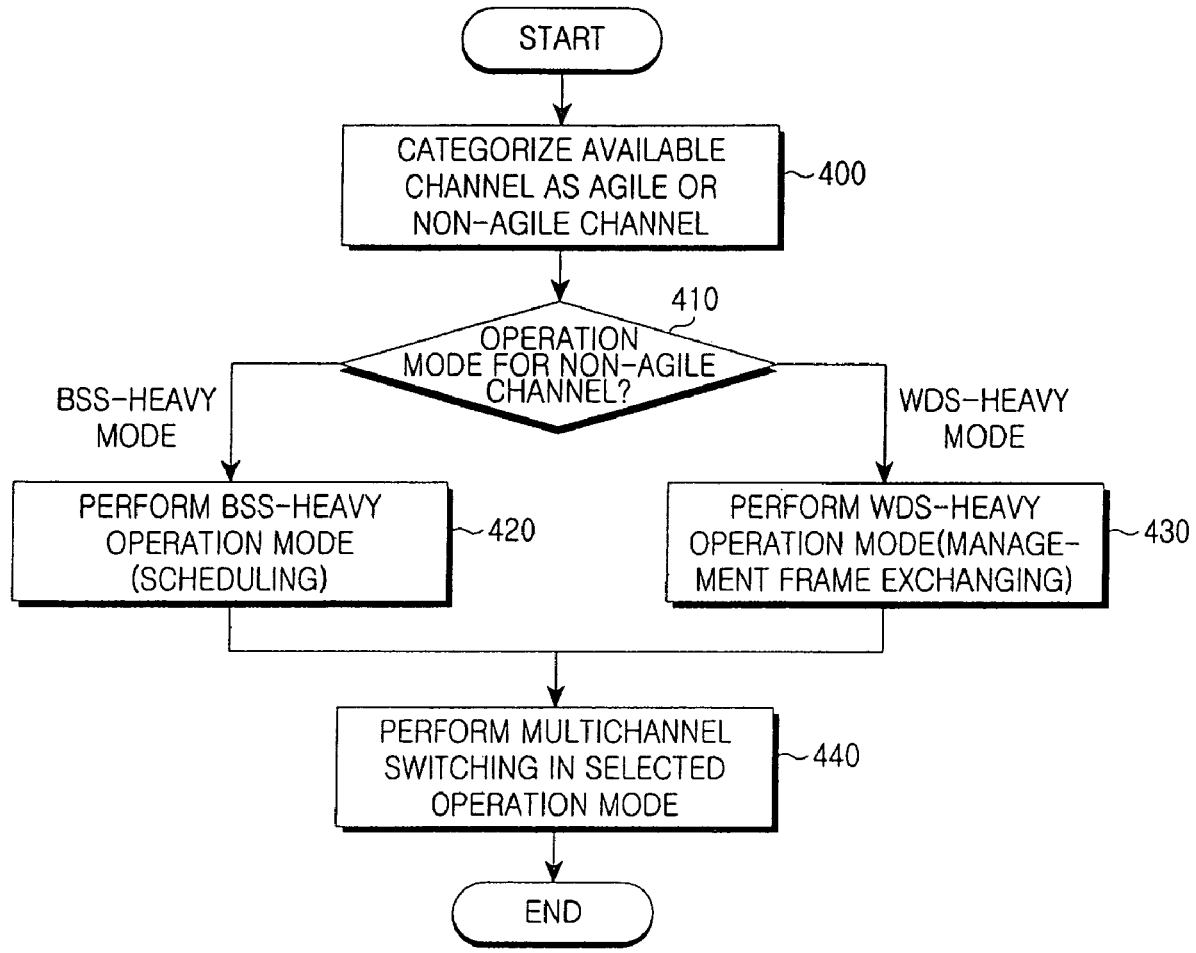
FIG. 4 is a flowchart illustrating a non-agile channelization method for multichannel MAC according to an exemplary embodiment of the present invention.

FIG. 4 is a flowchart illustrating a non-agile channelization method for multichannel MAC according to an exemplary embodiment of the present invention.

Referring to FIG. 4, in step 400, a MAP of a wireless mesh network categorizes available channels as agile or non-agile channels. In step 410, the MAP selects an operation mode for the channels categorized as the non-agile channels. In step 420, if the selected operation mode is a BSS-Heavy mode, the MAP performs a traffic handling operation according to a BSS-Heavy scenario of the BSS-Heavy mode described in FIG. 2 (that is, performs scheduling to perform a multichannel operation). In step 430, if the selected operation mode is a WDS-Heavy mode, the MP performs a traffic handling operation according to a WDS-Heavy scenario of the WDS-Heavy mode described in FIG. 3 (that is, exchanges management frames to perform a multichannel operation). In step 440, the MAP performs multichannel switching according to the selected operation mode.

Figure 5:
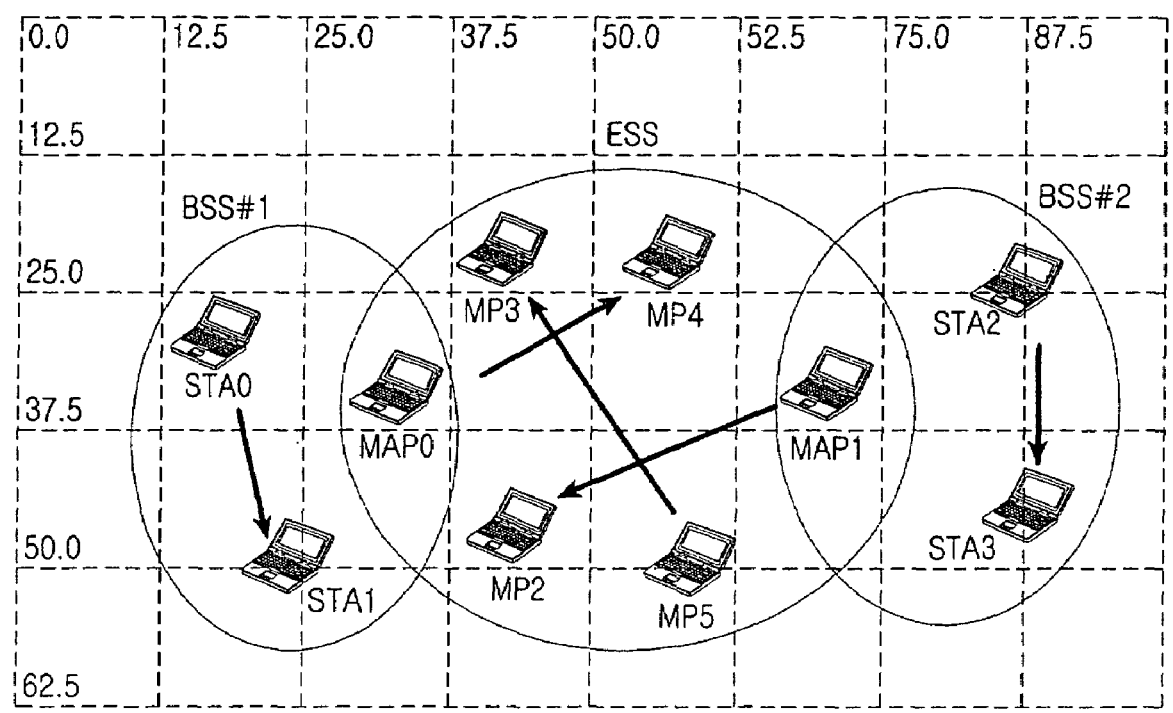
FIG. 5 is a diagram illustrating a topology used for a BSS-Heavy traffic scenario according to an exemplary embodiment of the present invention.

FIG. 5 is a diagram illustrating a topology used for a BSS-Heavy traffic scenario according to an exemplary embodiment of the present invention.

Referring to FIG. 5, a condition set for simulating the BSS-Heavy mode is as follows. In an exemplary implementation, there are 1 or 2 MAPs, 2 or 4 STAs per MAP, the MAPs switch channels only after CCW, and the simulation is performed with/without (virtual) CTS-TO-SELF.

Under this condition, the simulation results on the change in throughput as the channels increase based on the network topology of FIG. 5 in each of IEEE 802.11a (1 Ch: 16.05 Mbit/s) and 802.11b (1 Ch: 4.76 Mbit/s), are shown in Table 1 and Table 2 below.

TABLE 1

| Number of MAPs | Number of STAs per MAP | Throughput (Mbps) | Channel Utilization WDS | BSS1 | BSS2 |
|---|---|---|---|---|---|
| 1 | 2 | 31.170 | 0.827 | 0.787 | |
|   |   |        | 0.967 | 0.828 | |
|   | 4 | 31.978 | 0.829 | 0.827 | |
|   |   |        | 0.964 | 0.875 | |
| 2 | 2 | 46.476 | 0.828 | 0.787 | 0.786 |
|   |   |        | 0.963 | 0.827 | 0.827 |
|   | 4 | 48.099 | 0.830 | 0.827 | 0.827 |
|   |   |        | 0.948 | 0.875 | 0.875 |

TABLE 2

| Number of MAPs | Number of STAs per MAP | Throughput (Mbps) | Channel Utilization WDS | BSS1 | BSS2 |
|---|---|---|---|---|---|
| 1 | 2 | 9.200 | 0.916 | 0.848 | |
|   |   |       | 0.959 | 0.857 | |
|   | 4 | 9.490 | 0.917 | 0.901 | |
|   |   |       | 0.956 | 0.910 | |
| 2 | 2 | 13.735 | 0.916 | 0.850 | 0.854 |
|   |   |        | 0.956 | 0.859 | 0.863 |
|   | 4 | 14.250 | 0.914 | 0.902 | 0.901 |
|   |   |        | 0.942 | 0.910 | 0.910 |

In summarizing the simulations, from the simulation results of Table 1 and Table 2, multiple BSS channels are effective for the increase in throughput of legacy STAs. That is, multiple WDS channels are effective for the increase in throughput of MPs. The two operation modes coexist with the existing agile channel switching, as they can be handled in parallel.

As can be understood from the foregoing description, certain exemplary embodiments of the present invention provide a non-agile channelization method for multichannel MAC, for enabling non-agile channel switching to make the network connected.

In addition, the present invention provides a non-agile channelization method for multichannel MAC, for making agile and non-agile channel switching coexist, to avoid a change in the existing hardware.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A non-agile channelization method for multichannel medium access control (MAC), the method comprising:
    categorizing by a mesh access point (MAP) an available channel as at least one of an agile and non-agile channel;
    selecting by the MAP an operation mode of the channel categorized as the non-agile channel; and
    performing by the MAP multichannel switching according to the selected operation mode.

2. The non-agile channelization method of claim 1, wherein the available channel is managed by a channel utilization vector.

3. The non-agile channelization method of claim 2, wherein the channel utilization vector is expressed as $U=[u_1, u_2, \ldots, u_N]$ where $u_i \in \{0,1\}$, $i=1, 2, \ldots N$, $u_i=0$ indicates that a channel $u_i$ is available, and $u_i=1$ indicates that a channel $u_i$ is in use.

4. The non-agile channelization method of claim 1, wherein the selection of the operation mode is individually achieved for every mesh point.

5. A non-agile channelization method for multichannel medium access control (MAC), the method comprising:
    categorizing by a mesh access point (MAP) an available channel as at least one of an agile and non-agile channel;
    selecting by the MAP an operation mode of the channel categorized as the non-agile channel; and
    performing by the MAP multichannel switching according to the selected operation mode, wherein the operation mode comprises at least one of a basic service set (BSS)-heavy operation mode and a wireless distribution system (WDS)-heavy operation mode.

6. The non-agile channelization method of claim 5, wherein the BSS-heavy operation mode comprises a scheduling for performing a multichannel operation.

7. The non-agile channelization method of claim 6, wherein the scheduling comprises:
    tuning, by the MAP, to a common channel at a start of a channel coordination window (CCW);
    transmitting, by the MAP, Clear-To-Send (CTS)-TO-SELF to stations during CCW; and
    tuning, by the MAP, to BSS channel after CCW.

8. The non-agile channelization method of claim 5, wherein the WDS-heavy operation mode comprises a management frame exchanging for performing a multichannel operation.

9. The non-agile channelization method of claim 8, wherein the exchanging comprises:
    dynamically achieving, by mesh points (MPs), a cluster by exchanging the management frame during CCW; and
    allocating after CCW, by stations, network allocation vectors (NAVs) by CTS-TO-SELF, thereby associating with a MAP that joins the dynamic cluster.

10. A non-agile channelization method for multichannel medium access control (MAC), the method comprising:
    selecting by a mesh access point (MAP) an operation mode of a channel categorized as a non-agile channel from among a plurality of available channels; and
    performing by the MAP multichannel switching according to the selected operation mode,
    wherein the plurality of available channels are managed by a channel utilization vector which is expressed as $U=[u_1, u_2, \ldots, u_N]$ where $u_i \in \{0, 1\}$, $i=1, 2, \ldots N$, $u_i=0$ indicates that a channel $u_i$ is available, and $u_i=1$ indicates that a channel $u_i$ is in use.

11. The method of claim 10, further comprising:
    categorizing by the MAP the plurality of available channels as at least one of an agile and non-agile channels.

\* \* \* \* \*